(12) United States Patent
Ku (10) Patent No.: US 6,889,349 B2
(45) Date of Patent: May 3, 2005

(54) DIGITAL EVENT SAMPLING CIRCUIT AND METHOD

(75) Inventor: Joseph Weiyeh Ku, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 539 days.

(21) Appl. No.: 09/934,891

(22) Filed: Aug. 22, 2001

(65) Prior Publication Data

US 2003/0046627 A1 Mar. 6, 2003

(51) Int. Cl.[7] .............................................. G01R 31/28
(52) U.S. Cl. ........................ 714/739; 714/738; 714/819; 375/354; 327/156; 307/409
(58) Field of Search .................................. 714/739, 738, 714/744, 819; 375/354; 327/156, 176; 377/29; 307/409; 702/180; 340/870.29, 578; 360/51; 324/678; 331/1 A; 346/33 R; 711/109; 348/564; 235/375; 345/634

(56) References Cited

U.S. PATENT DOCUMENTS

| | | | | | |
|---|---|---|---|---|---|
| 3,801,834 A | * | 4/1974 | Lai | .............................. | 327/176 |
| 3,882,492 A | * | 5/1975 | McSorley et al. | ........... | 340/518 |
| 4,202,019 A | * | 5/1980 | Popoff et al. | .................. | 360/51 |
| 4,320,962 A | * | 3/1982 | Takahashi et al. | ........... | 345/634 |
| 4,339,759 A | * | 7/1982 | Nakatsu | ...................... | 346/33 R |
| 4,519,090 A | * | 5/1985 | Stackhouse et al. | ........... | 377/29 |
| 4,531,102 A | * | 7/1985 | Whitlock et al. | ............ | 331/1 A |
| 5,243,637 A | | 9/1993 | Flaherty et al. | | |
| 5,519,389 A | * | 5/1996 | DeGunther et al. | ..... | 340/870.29 |
| 5,961,577 A | | 10/1999 | Soenen et al. | | |
| 6,034,738 A | * | 3/2000 | Sparks | ........................ | 348/564 |
| 6,499,656 B1 | * | 12/2002 | Marsh et al. | ................ | 235/375 |
| 6,516,384 B1 | * | 2/2003 | Clark et al. | .................. | 711/109 |
| 6,600,328 B2 | * | 7/2003 | Ku | .............................. | 324/678 |
| 2002/0103619 A1 | * | 8/2002 | Bizjak | ......................... | 702/180 |

* cited by examiner

*Primary Examiner*—Albert DeCady
*Assistant Examiner*—Dipakkumar Gandhi (57) ABSTRACT

A method and circuit periodically pseudo-randomly select a sample of digital event pulses comprising a logic data signal. A first timer times a first time interval. A second timer times a second time interval within the first time interval. A delay timer, coupled between the first and second timers, pseudo-randomly delays initiation of the second timer from the start of the first time interval. In one embodiment, the first timer is an (N+1)-bit binary counter. The delay timer includes an N-bit round robin latch and seeded by a pseudo-random number generator having fewer than N bits, the round robin latch shifting its contents to form an N-bit pseudo-random number. The second timer is initiated when the value of the first timer is equivalent to the round robin latch. A coincidence circuit passes digital event pulses during the second time interval. A count is accumulated of the sampled digital event pulses.

26 Claims, 5 Drawing Sheets

DIGITAL EVENT SAMPLING CIRCUIT AND METHOD

CROSS-REFERENCE TO RELATED APPLICATIONS

This application is related to co-pending applications entitled, "Analog Method and Circuit for Monitoring Digital Events Performance," by Joseph Weiyeh Ku, Ser. No. 09/935,021 and "Fine-Grained Thermal Control In Memory Subsystems," by Joseph Weiyeh Ku and Chandrakant Patel, Ser. No. 09/934,615, filed in the United States Patent and Trademark Office on the same date as the present application. The above-mentioned related applications are incorporated by reference into this present application.

FIELD OF THE INVENTION

The present invention generally relates to integrated circuit devices and, more particularly, to a performance monitor for pseudo-randomly sampling a logic data signal.

BACKGROUND OF THE INVENTION

It is desirable to monitor the performance of digital circuits for a variety of purposes. As component and circuit physical size decrease and the complexity and speed of integrated circuits increase, entire systems comprising a plurality of functional blocks are contained in single chips. In order to monitor the performance of these systems, or portions thereof, large numbers of monitors are deployed in different locations on the chip. One method for monitoring performance of digital circuits is to count a quantity of digital activity occurring within a known period of time.

Counting digital events as a way of measuring performance has conventionally been accomplished using digital binary counter circuits. An advantage of using binary counters is the ability to count digital events precisely. In one conventional method, all digital events of interest occurring within a time period are precisely counted using a binary counter. A conventional binary counter has a bit length in the range of 10 to 20 bits with counting capacity being proportional to bit length. The capacity (i.e., bit length) of a binary counter for a particular application is designed to accommodate the quantity of expected events. The ability to conventionally count digital events for performance monitoring purposes is limited by chip space available for performance-monitoring functions, the amount of chip space necessary to construct binary counters of sufficient size, the circuit complexity needed to interconnect the performance-monitoring counters, and the operation time required to periodically interrogate each performance-monitoring counter's stored information.

Using digital counters to obtain a precise count of all digital events also has significant disadvantages. As clock speeds continue to increase, the rate and quantity of digital events occurring within the fixed time period also increase. This increase in the quantity of digital events to count quickly consumes the capacity of binary counters. Increasing counter capacity often slows overall system operation time due to the long serial scan vectors necessary to interrogate large counters for data retrieval. The complexity of large binary counters, and the accompanying circuitry necessary to interconnect large digital counters to other performance monitoring logic, also increases costs and occupies valuable integrated circuit space.

In many digital event performance evaluation applications, a precise digital event count, is not necessary. In some evaluation applications, an approximate count of the entire population is adequate, for example, in regulating system chip power or dispatching chip cooling mechanisms. One method for obtaining an approximate count of a population of events is through statistical analysis of samples taken from the population, from which inferences regarding the balance of the population are made.

A method and circuit for monitoring the performance of digital systems that address the aforementioned problems, as well as other related problems, are therefore desirable.

SUMMARY OF THE INVENTION

The present invention is directed to a circuit arrangement and method for sampling a logic data signal. The present invention is exemplified in a number of implementations and applications, some of which are summarized below.

According to one example embodiment of the present invention, a circuit arrangement for sampling a logic data signal is provided. The circuit arrangement includes a first timer adapted to time a first time interval, a second timer adapted to time a second time interval, and a delay timer. The delay timer is coupled to the first timer and adapted to time a delay time interval initiated from the start of the first time interval. The second timer is coupled to the delay timer and initiates timing at the end of the delay time interval. A coincidence circuit receives the logic data signal on an input terminal. The coincidence circuit has an enable terminal coupled to the second timer and is adapted to pass a sample of digital event pulses comprising the logic data signal from the input terminal to an output terminal during the second time interval.

According to another example embodiment of the present invention, a circuit arrangement for sampling a plurality of digital event pulses is provided. The circuit arrangement includes a first timer and a second timer. The first timer is adapted to time a plurality of base time intervals. The second timer is adapted to generate a sampling window signal for a sampling window time interval, the sampling window time interval being a shorter time than any of the base time intervals. A sample window initiate circuit is coupled to the first timer and adapted to start the second timer at a pseudo-random time within each of the plurality of base time intervals. A sampler circuit is coupled to the second timer and arranged to receive the plurality of digital event pulses and to pass a sample of digital event pulses responsive to the sampling window signal.

According to yet another example embodiment of the present invention, a method for sampling a logic data signal is provided. The method includes receiving a plurality of digital event pulses characterizing the logic data signal during each of a series of base time intervals, applying a sampling window signal for a sample window time interval beginning at a pseudo-random time during each of the series of base time intervals, selecting a subset of digital event pulses during application of the sampling window signal, and accumulating a count of the subset of digital event pulses.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Monitoring digital circuitry performance includes counting a quantity of digital events of interest. More particularly, digital events occurring within a fixed time period are counted to determine a rate of digital event activity during the time period. Complete, and thus perfect, information is obtained about a population of digital events by counting the entire population. Often, obtaining a full and precise digital event count in real-time is not economical, feasible or even possible. Limited system resources, such as chip space available for performance monitoring circuitry, cost, and available processing time bound performance monitoring capabilities. In numerous applications, approximate information is sufficient, for example, in regulating system chip power, regulating processing speed or dispatching chip cooling mechanisms.

Approximate performance monitoring information about a population of digital events is economically and efficiently obtained through statistical analysis. By appropriately sampling the population of digital events, and measuring (i.e., counting) digital events of the sample rather than the entire population, reasonably accurate inferences regarding the population are determinable. The extent to which the sample is representative of the population is affected by several variables, including sample size and the degree of randomness by which the sample was selected from the population. By using well-known statistical methods, the degree of various types of error introduced through statistical analysis methods are controlled within acceptable limits determined for each particular application. The present invention is directed to a circuit arrangement and method for sampling a logic data signal. The present invention is exemplified in a number of implementations and applications, some of which are summarized below.

The performance monitoring circuit and method of the present invention measures digital activity rates. A base time period is defined over which it is desirable to determine an activity rate. A quantity of digital events occurring within the base time period is measured to determine rate (i.e., quantity divided by time). The process is repeated periodically to provide continuous performance monitoring information. The performance monitoring method of the present invention further incorporates features to leverage design trade-offs between required measurement accuracy, performance monitoring circuit space requirements and processing time allotments. Statistical sampling techniques, incorporated into the method of the present invention, reduce the quantity of digital events to count while providing valid rate information over a broader base time period. Reduction in the quantity of digital events to count requires less counting circuit capacity and complexity. Processing time necessary to perform and evaluate counting is also reduced.

Statistical sampling is achieved by selecting a sampling window time interval within each base time period. Only digital events occurring within the sample window time interval are counted. By selecting the sample window time interval randomly within the base time interval, activity occurring (and measured) during the sample window time interval is likely representative of activity occurring throughout the base time interval according to statistical analysis. One method to "select" the sample window time interval randomly within the base time interval, is to delay the start of the sample window time interval from the start of the base time interval by a randomly-variable time. The base time interval (duration) is fixed and known. The sample window time interval (duration) is also known and fixed equal to or less than the base time interval. Therefore, the base time interval less the sample window time interval defines a range of available delay times from the start of the base time interval within which the sample window time interval must be initiated so that the sample window time interval will conclude within the base time interval.

Further space efficiency is achieved in implementing the method of the present invention using pseudo-random selection of the sample window time interval location within the base time interval rather than true randomness. A random number generator circuit is complex, costly, and space-intensive to implement. The present invention includes a pseudo-random number generator and round-robin latch to achieve nearly random results in a less complex, less costly and less space-intensive circuit to select the sample window time interval. The circuit and method of the present invention is an attractive design compromise for performance monitoring applications where the loss in statistical analysis accuracy (due to less than random sample selection) is tolerable.

According to one example embodiment of the present invention, a circuit arrangement is provided for monitoring performance by sampling a logic data signal. The circuit arrangement provides a random window sampling mechanism within a specified timing range to collect a large amount of statistical data relatively simply using minimal area to implement necessary circuitry. The circuit arrangement includes a first timer adapted to time a first time interval, a second timer adapted to time a second time interval, and a delay timer. The first time interval is proportional to the observance frequency. The second timer determines the time window during which event sampling occurs. The delay timer is coupled to the first timer and adapted to time a delay time interval initiated from the start of the first time interval. The second timer is coupled to the delay timer and initiates timing at the end of the delay time interval. The delay time is controlled within a range that permits the second timer to fully time out within the first time interval. A coincidence circuit receives the logic data signal on an input terminal. The coincidence circuit has an enable terminal coupled to the second timer and is adapted to pass a sample of digital event pulses comprising the logic data signal from the input terminal to an output terminal during the second time interval.

In a further example embodiment, the first timer is a binary count register having N+1 bits and the delay timer is a latch register having N bits. The binary count register times by counting clock cycles. The value of the latch register is representative of the length of the delay as a number of clock cycles, providing a finite set of discrete delay times (multiples of clock cycles). A comparator circuit is adapted to initiate the second timer when the value of the binary count register and a value derived from the latch register are equivalent. Logic is provided to ensure that the second timer is initiated early enough to permit the second timer to fully time out on or before the first timer times out. In a further example embodiment, the delay timer is adapted to vary the delay time interval, for example, by having a pseudo-random number generator seed, or populate, the latch register. The latch register is a shifting latching register, such as a round robin latch. In a further example embodiment, the pseudo-random number generator has fewer bits than the latch register. A pseudo-random number of N bits is formed in the latch register by initially resetting the latch register to "0," allowing the pseudo-random number generator to run free for several cycles, then populating the latch register from the pseudo-random number generator, shifting the latch register to wrap around, and again populating the latch register from the pseudo-random number generator and shifting the latch register contents to wrap around. This process is repeated for several cycles and then stopped.

In a still further embodiment of the present invention, the second timer is a second binary counter and has M+1 bits, where M is less than or equal to N, to produce a second time interval having a duration less than or equal to the first time interval. For example, to sample events within a 1 microsecond window within each 1 millisecond time range using a 1 GHz clock rate, a 20 bit (plus 1 overflow bit) first timer count register provides a 1 millisecond first time interval, a 10 bit (plus 1 overflow bit) second timer count register provides a 1 microsecond second time interval (timing window within each 1 millisecond first time interval). A pseudo-random number generator having a 5 bit counter is used to populate a 20 bit latch register. In another example embodiment, the first timer is adapted to time a series of periodic first time intervals, for example, by resetting and/or restarting the first timer after each first time interval times out. The delay timer is adapted to determine a new delay time for each first time interval, for example, by forming a new N bit pseudo-random number prior to each first time interval. The new delay time is not prohibited from being the same as the previous delay time. In a further example embodiment, a counting circuit is coupled to the output terminal of the coincidence circuit. The counting circuit includes the counting circuits described in "Analog Method and Circuit for Monitoring Digital Events Performance," by Joseph Weiyeh Ku, U.S. Pat. No. 6,600,328 B2. Jul. 29, 2003. In a further example embodiment, the counting circuit is reset responsive to a reset signal derived from a first timer value. For example, the reset signal is derived from the first timer's most significant bit in one embodiment, and derived from a first timer overflow bit in other embodiment. In a still further example embodiment, the reset signal derived from first timer is supervised by external logic (not shown) blocking reset at the end of one or more base time intervals and allowing the counting circuit to accumulate a count over a plurality of sampling window intervals. For example, in the case of a "low event count," where an accumulated count does not exceed some minimum threshold, the counting circuit is not reset at the end of the base time interval. In an alternative example embodiment of the present invention, a counting circuit reset signal is derived from external logic (not shown) and not derived from the first timer at all enabling count accumulation over a plurality of sampling window intervals. In another alternative embodiment, the reset signal is associated with the end of the sampling window interval.

According to another example embodiment of the present invention, a circuit arrangement for sampling a plurality of digital event pulses is provided. The circuit arrangement includes a first timer and a second timer. The first timer is adapted to time a plurality of base time intervals. The second timer is adapted to generate a sampling window signal for a sampling window time interval, the sampling window time interval being a shorter time than any of the base time intervals. A sample window initiate circuit is coupled to the first timer and adapted to start the second timer at a pseudo-random time within each of the plurality of base time intervals which permits the second timer to time out within each base time interval. For example, first timer is a binary counter having N+1 bits and second timer is a binary counter having M+1 bits, M being less than or equal to N, in one embodiment, the binary counters counting clock cycles where the pseudo-random time is a discrete binary value of the first timer. A sampler circuit is coupled to the second timer and arranged to receive the plurality of digital event pulses and to pass a sample of digital event pulses responsive to the sampling window signal.

According to a further embodiment of the present invention, the sample window initiate circuit includes a pseudo-random number generator having K bits, K being less than N, coupled to a shift register having N bits, for example, a round robin latch. The shift register is arranged to initially have all bits set to "0" before receiving and shifting binary pseudo-random numbers from the pseudo-random number generator to form an N bit pseudo-random number.

According to a still further embodiment of the present invention, a counting circuit is coupled to the sampler circuit to accumulate a count of digital event pulses in the sample. In one example embodiment, the counting circuit is a digital counter, such as a binary count register. In another example embodiment, the counting circuit is an analog circuit as described in the co-pending application Ser. No. 09/935,021 entitled, "Analog Method and Circuit for Monitoring Digital Events Performance," by Joseph Weiyeh Ku. In another example embodiment of the present invention, the counting circuit resets responsive to a value of the first timer, for example, when the most significant bit of the first timer is equal to a one. In another example embodiment, the counting circuit is reset responsive to a reset signal derived from an external circuit (not shown) permitting a count to be accumulated over a plurality of sampling window intervals as determined according to application of the present invention by one skilled in the relevant art.

According to yet another example embodiment of the present invention, a method for sampling a logic data signal is provided by a random window sampling mechanism within a specified timing range. The method includes receiving a plurality of digital event pulses characterizing the logic data signal during each of a series of base time intervals, applying a sampling window signal for a sample window time interval beginning at a pseudo-random time during each of the series of base time intervals and concluding within the base time interval, selecting a subset of digital event pulses during application of the sampling window signal, and accumulating a count of the subset of digital event pulses. Further steps include initially resetting all latches and counters to "0," timing each base time interval with a base time binary counter, the base time binary counter adapted to count clock cycles; timing the sample window time interval with a sample window binary counter, the sample window binary counter adapted to count clock cycles; seeding a round robin latch with values from a pseudo-random number generator, the round robin latch have the same bit length as the base time counter and the pseudo-random number generator having fewer bits than the round robin latch; shifting the round robin latch bit values to populate all bits of the round robin latch and form a pseudo-random number having the same bit length as the base time counter; initiating timing of the sample window time interval when a value of the base time binary counter is equivalent to a value of the round robin latch; and resetting the count of the subset of digital event pulses accumulated at the end of each base time interval. Alternatively, the count of the subset of digital event pulses is not reset at the end of each base time interval in order to accumulate a count of digital event pulses over a plurality of sampling window intervals.

Figure 1A:
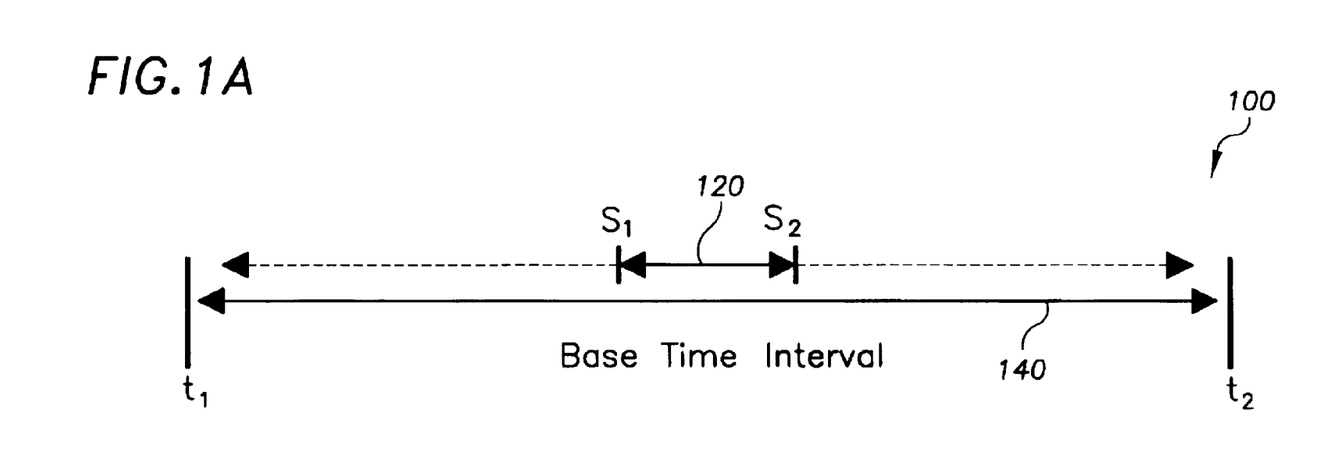
FIG. 1A is a timing diagram illustrating one example embodiment of a sampling window randomly located within a base time interval in accordance with the present invention.

FIG. 1A shows a timing diagram 100 illustrating one example embodiment of a sampling window time interval 120 located within a base time interval 140 in accordance with the present invention. Base time interval 140 is one of a series of periodic time intervals, all having a fixed duration. Base time interval 140 begins at time t1 and ends at time t2. Sampling window time interval 120 begins and ends within base time interval 140. Sampling window time interval 120 also has a fixed duration equal to or less than the duration of base time interval 140. Sampling window time interval begins at time s1 and ends at time s2. Sampling window time interval 120 does not extend outside base time interval 140 to maintain accuracy in sampling data. The duration of sampling window time interval 120 is equal to or less than the duration of base time interval 140.

Sampling window time interval 120 begins randomly within base time interval 140, the beginning of sampling window time interval 120 occurring at or before a time which permits sampling window time interval 120 to end at or before t2. In one example embodiment of the present invention, base time interval 140 is timed by a first digital counter counting clock cycles. Base time interval 140 is an integer multiple of clock cycles of a first clock signal. Similarly in a further embodiment of the present invention, sampling window time interval 120 is timed by a second digital counter counting clock cycles of a second clock signal. First and second clock signals are the same clock signal in one example embodiment of the present invention. In this embodiment, the bit length second digital counter is equal to or less than the bit length of first digital counter such that sample window time interval is less than or equal to base time interval.

Figure 1B:
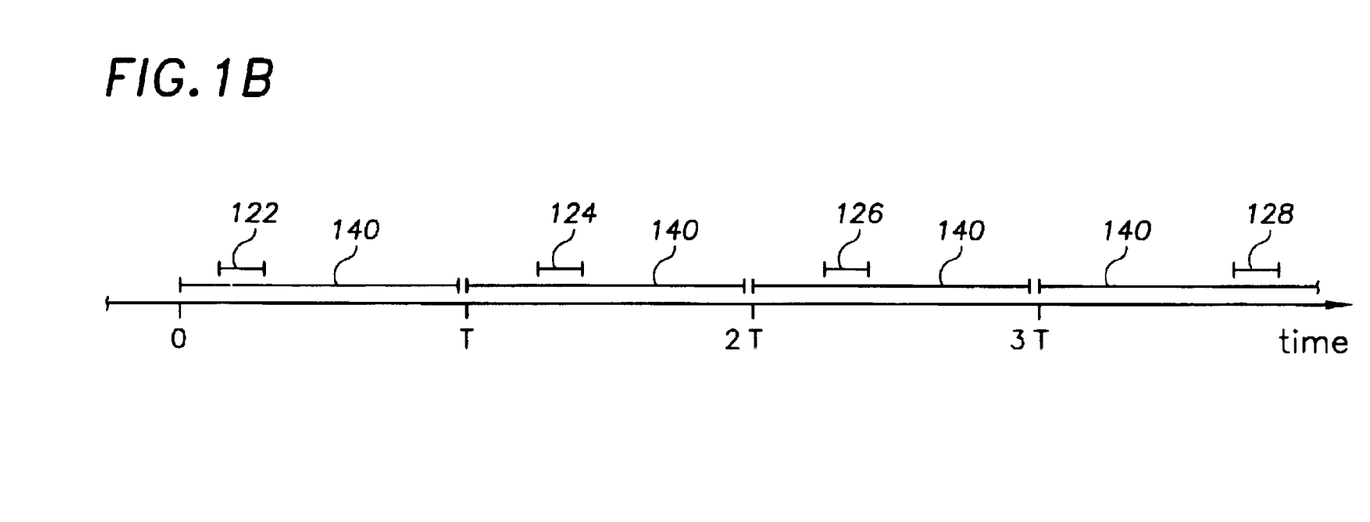
FIG. 1B is a timing diagram illustrating one example embodiment of a series of base time intervals, each having a randomly-located sampling window in accordance with the present invention.

FIG. 1B illustrates a series of base time intervals 140 occurring with a period of T over time. In the example embodiment illustrated in FIG. 1B, some finite time separates each base time period. In other example embodiment, base time intervals are not separated by any intentional time delay. In another example embodiment of the present invention, base time intervals overlap in time. A sample window time interval occurs within each base time interval as illustrated by sample window time intervals 122, 124, 126 and 128. As is illustrated graphically, a delay time from the start of each base time interval until the start of the sample window time interval occurring with said base time interval is variable from one base time interval to another. In a further example embodiment of the present invention, the delay times vary randomly from one base time interval to another. In an alternative example embodiment, the delay time does not vary from one base time interval to another, but is determined randomly prior to the first base time interval of a series of base time intervals and remains the same for each base time interval of the series.

Figure 2:
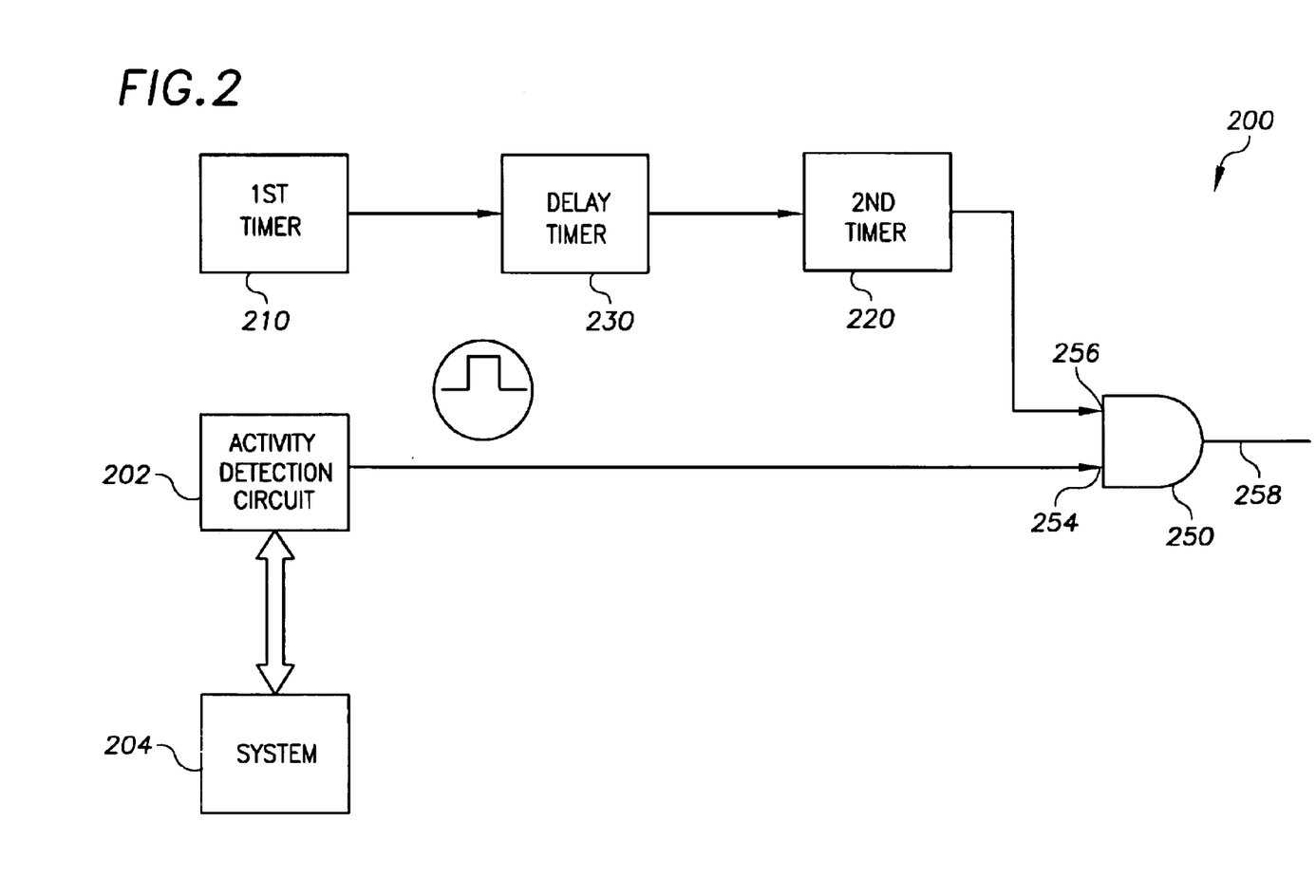
FIG. 2 is a block diagram of one example embodiment of a circuit arrangement in accordance with the present invention.

FIG. 2 illustrates an example embodiment of a circuit arrangement 200 of the present invention. An activity detection circuit 202 is communicatively coupled to a system 204 to be monitored. System 204 may be a computer or memory system, with activity detection circuit 202 monitoring a signal path within system 204. The signal path communicates a first logic data signal, for example. Activity detection circuit 202 generates a second logic data signal comprising a plurality of digital event pulses in response to the first logic data signal. A coincidence circuit 250 has an input terminal 254, an enable terminal 256, and an output terminal 258. Coincidence circuit is adapted to pass a signal from input terminal 254 to output terminal 258 when an enable signal is received at enable terminal 256. Coincidence circuit 250 is an AND gate in one example embodiment.

Activity detection circuit 202 is coupled to input terminal 254 such that the second logic data signal is communicated to coincidence circuit 250. A first timer 210 is coupled to a delay timer 230 and a second timer 220 is coupled to delay timer 230. Second timer 220 is further coupled to enable terminal 256. First timer 210 times a first time interval. Second timer 220 times a second time interval and delay timer 230 times a delay time interval. Timers 210, 220 and 230 are arranged to initiate timing of second time interval after the delay time interval from the start of the first time interval. In one example embodiment, delay timer logic confines delay time within a range permitting second time interval to begin at least the second time interval before the end of the first time interval. Second timer 220 is adapted to communicate a signal to enable terminal 256 during second time interval. As one skilled in the relevant art will appreciate, a portion of second logic data signal communicated to input terminal 254 during second time interval is passed to output terminal 258, and the remaining portion of second logic data signal communicated to input terminal 254 at other than during second time interval is not passed to output terminal 258.

Figure 3:
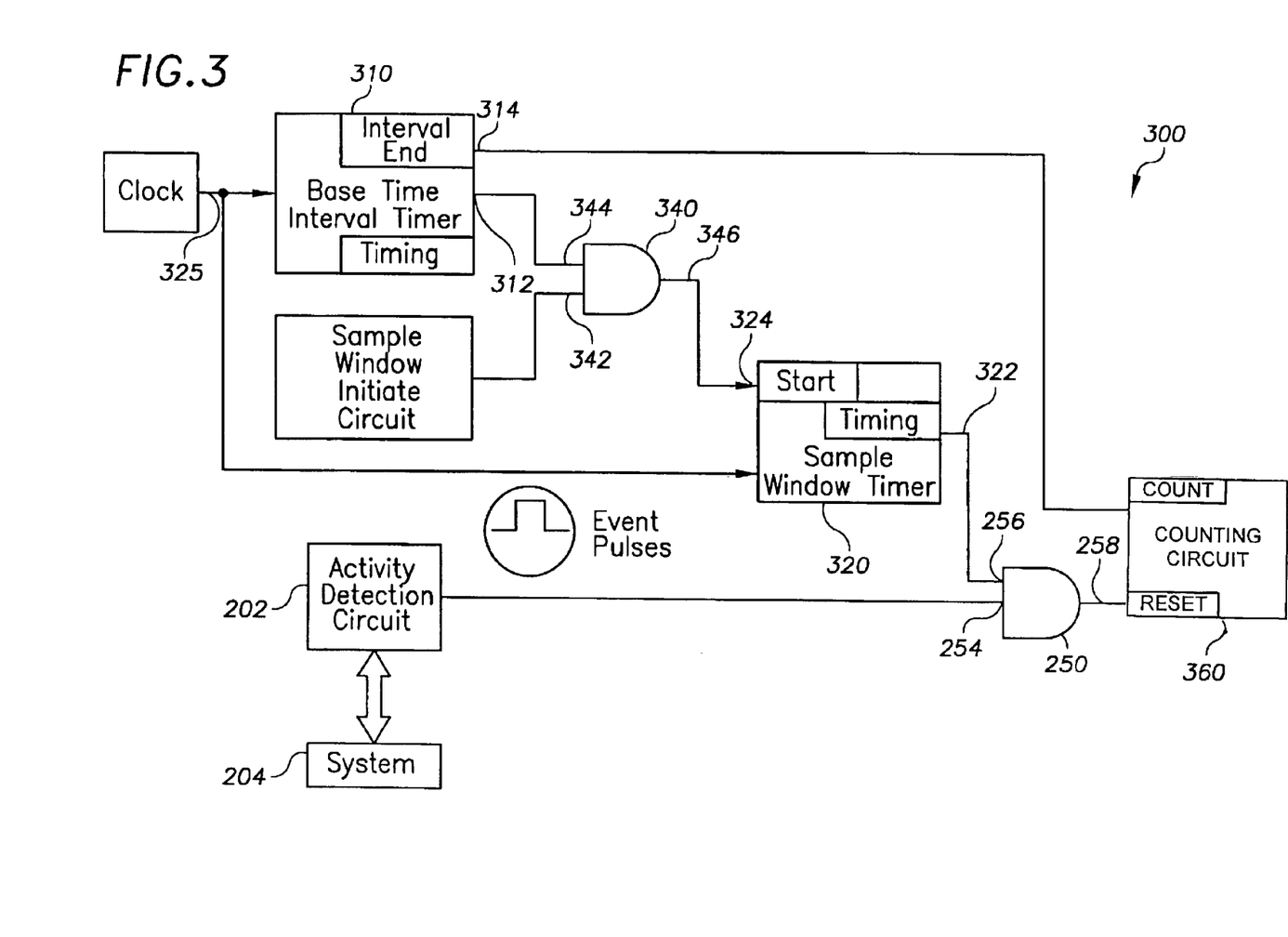
FIG. 3 is a block diagram of another example embodiment of a circuit arrangement in accordance with the present invention.

FIG. 3 illustrates a digital event sampling circuit arrangement 300 according to another example embodiment of the present invention. Elements illustrated with like numbers indicate like elements throughout the figures. Circuit arrangement 300 functions to count a quantity of digital events occurring within a sample period, the sample period being a portion of a base time period. Circuit arrangement 300 includes activity detection circuit 202. Activity detection circuit 202 is coupled to system 204 and detects occurrence of system 204 activities of interest as was described previously for FIG. 2. For example, activity detection circuit 202 detects address and/or data transitions on a memory bus in one embodiment.

Activity detection circuit 202 generates a logic data signal characterized by a plurality of digital event pulses representative of the activity detected within system 204. The duration of each digital event pulse is substantially proportional to the quantity of activity detected by activity detection circuit 202. For example, in one example embodiment, each digital event pulse represents a fixed quantity of system activity and each digital event pulse has the same substantially fixed time duration. In an alternative embodiment, a digital event pulse represents another, larger quantity of system activity with the duration of the digital event pulse being proportional to the quantity of system activity detected. For example, a digital event pulse representing twice the quantity of system activity has a digital event pulse duration twice as long as a digital event pulse representing a single quantity of system activity. Activity detection circuit 202 is coupled to input terminal 254.

Circuit arrangement 300 includes a base time interval timer 310 and a sample window timer 320, each timer coupled to a clock 325. A comparator 340 has a first input terminal 342, a second input terminal 344, and output terminal 346. A sample window initiate circuit 330 is coupled to first input terminal 342. Base time interval timer 310 has a timing output terminal 312 coupled to second input terminal 344, and a interval end output terminal 314. Comparator output terminal 346 is coupled to a start input terminal 324 of sample window timer 320. Sample window timer 320 has a timing output terminal 322 coupled to enable terminal 256 of coincidence circuit 250.

Sample window initiate circuit 330 is adapted to determine a delay time and arranged to communicate the delay time to comparator 340. Base time interval timer 310 is arranged to communicate a base time interval time to comparator 340. Comparator 340 is adapted to generate an output signal at output terminal 346 when the base time interval time is equal to the delay time. Sample window timer 320 is adapted to begin timing and generate a signal at timing output terminal 322 for a sample window time interval to enable coincidence circuit 250 responsive to the output signal received from comparator 340. Sample window initiate circuit 330 is adapted to determine a delay time within the range of base time interval less sample window time interval, to ensure sample window time interval begins and concludes during base time interval.

In one example embodiment, coincidence circuit 250 is an AND gate. Coincidence circuit 250 has an output terminal 258 coupled to a counting circuit 360. In one example embodiment, counting circuit 360 is a digital counter, such as a binary count register. In another example embodiment, counting circuit 360 is an analog circuit as described in "Analog Method and Circuit for Monitoring Digital Events Performance," by Joseph Weiyeh Ku, U.S. Pat. No. 6,600,328 B2. Jul. 29, 2003.

As previously described, coincidence circuit 250 passes digital event pulses received from activity detection circuit 202 on input terminal 254 to output terminal 258 when enabled (i.e., when a signal is present at enable terminal 256). Coincidence circuit 250 is enabled during the sample window interval time. Counting circuit 360 accumulates a count of digital event pulses communicated from coincidence circuit 250. Once sample window timer 320 times out at the conclusion of the sample window interval time, coincidence circuit 250 no longer passes digital event pulses to counting circuit 360. In this way, counting circuit 360 only receives digital event pulses to count during the sample window interval time.

The interval end terminal 314 of base time interval timer 310 is coupled to a reset input of counting circuit 360. Base time interval timer 310 and counting circuit 360 are arranged to reset the accumulated count at the end of a base time interval. In an alternative embodiment of the present invention, base time interval timer 310 is not coupled to a reset input of counting circuit 360. Counting circuit 360 is arranged to reset the accumulated count from a reset logic circuit (not shown), rather than from base time interval timer 310 thereby permitting a count to accumulate over a plurality of base time intervals.

Figure 4:
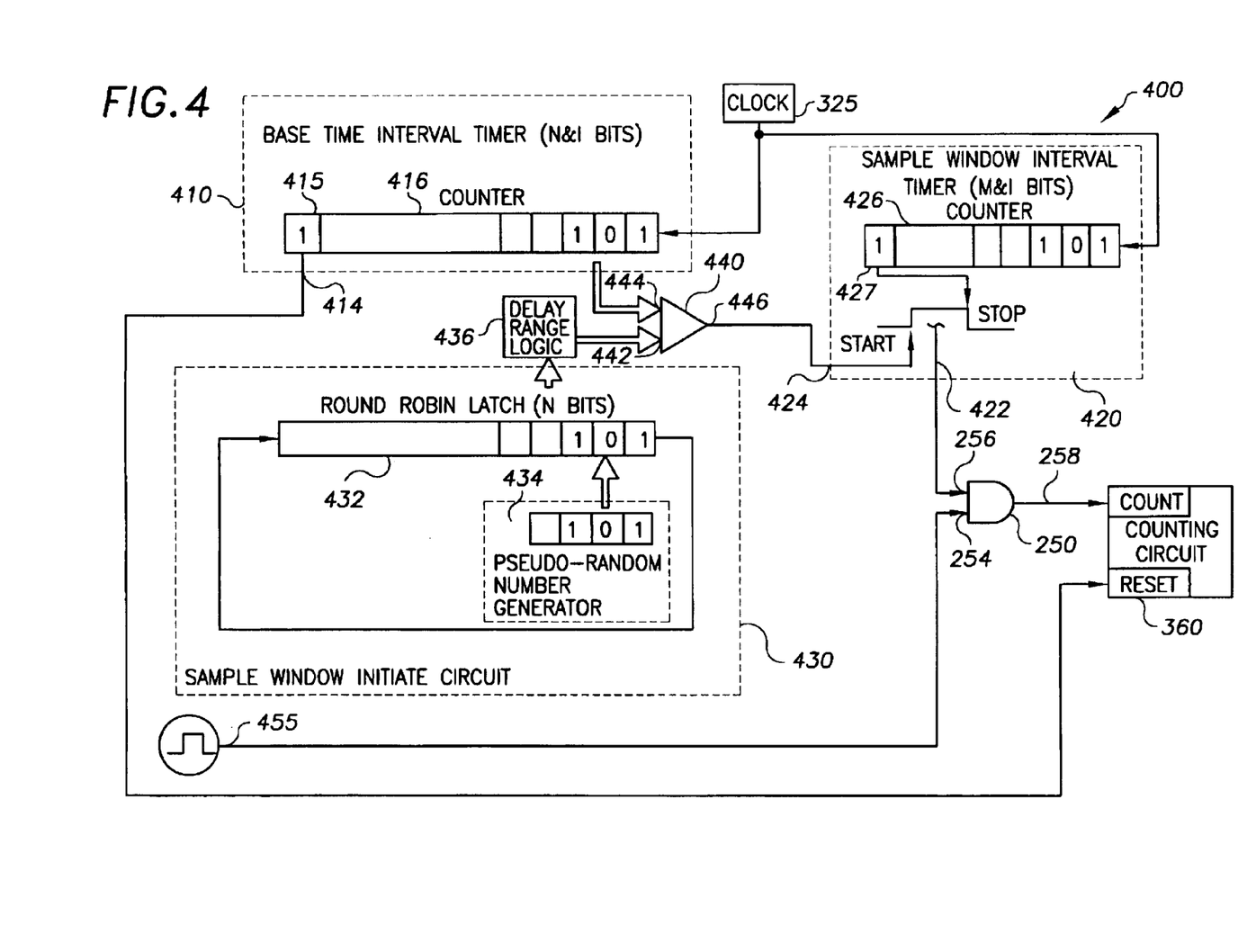
FIG. 4 is a block diagram of a further example embodiment of a circuit arrangement in accordance with the present invention.

FIG. 4 is a block diagram of a further example embodiment of a sampling circuit arrangement 400 in accordance with the present invention. Elements illustrated with like numbers indicate like elements throughout the figures. Circuit arrangement 400 functions is arranged similarly to circuit arrangement 300 to count a quantity of digital events occurring within a sample period, the sample period being a portion of a base time period. Activity detection circuit 202 is omitted from circuit arrangement 400; however, a logic data signal characterized by a plurality of digital event pulses (representative of the activity detected within system 204) is communicated to coincidence circuit 250 by signal path 455 coupled to input terminal 254.

Circuit arrangement 400 includes a base time interval timer 410 and a sample window interval timer 420, each timer coupled to a clock 325. A comparator 440 has a first input terminal 442, a second input terminal 444, and output terminal 446. A sample window initiate circuit 430 is coupled a delay range logic circuit 436, the delay range logic circuit coupled to first input terminal 442. Base time interval timer 410 is coupled to second input terminal 444. Additionally, base time interval timer 410 has an interval end output terminal 414 coupled to counting circuit 360 and arranged to reset the count accumulated in counting circuit 360 at some time during, or following, base time interval. In an alternative embodiment of the present invention, counting circuit 360 is not coupled to interval end output terminal 414, but rather counting circuit 360 is coupled to an external reset logic circuit (not shown) from which a count reset signal is derived. Comparator output terminal 446 is coupled to a start input terminal 424 of sample window interval timer 420. Sample window interval timer 420 has a timing output terminal 422 coupled to enable terminal 256 of coincidence circuit 250.

Sample window initiate circuit 430 is adapted to determine an initial delay time and arranged to communicate the initial delay time to a delay range logic circuit 436. Delay range logic circuit is adapted to modify the initial delay time to determine a delay time and arranged to communicate the delay time to comparator 440. Base time interval timer 410 is arranged to communicate a base time interval time to comparator 440. Comparator 440 is adapted to generate an output signal at output terminal 446 when the base time interval time is equal to the delay time. Sample window interval timer 420 is adapted to begin timing and generate a signal at timing output terminal 422 for a sample window time interval responsive to the output signal received from comparator 440. The signal at timing output terminal 422 enables coincidence circuit 250. Delay range logic circuit 436 ensures that the delay time is within the range of base time interval less sample window interval to ensure a full sample window interval occurs within base time interval.

In one example embodiment, coincidence circuit 250 is an AND gate. Coincidence circuit 250 has an output terminal 258 coupled to a counting circuit 360. Coincidence circuit 250 and counting circuit 360 are arranged and operate as previously described herein In the example embodiment illustrated in FIG. 4, base time interval timer 410 includes a first digital counter, or count register, 416 adapted to count cycles of a signal from clock 325. The duration of base time interval is an integral multiple of clock cycles, the multiple being defined as a value of counter 416. In one example embodiment, base time interval is proportional to the bit length, N+1, of counter 416. The most significant bit 415 of counter 416 is an overflow bit. Initially all N+1 bits of counter 416 are set to zero. The value of counter 416 increments for each clock cycle, thereby counting clock cycles sequentially until counter 416 reaches some predetermined value, for example, when the overflow bit becomes a "1." In one example embodiment of the present invention, base time interval timer 410 communicates a reset signal to counting circuit 360 at the end of the base time interval, for example, by the overflow bit of counter 416 being coupled to a reset input terminal of counting circuit 360 as shown in FIG. 4. Base time interval timer communicates base time interval time, for example, counter 416 register value, to comparator circuit 440. In an alternative embodiment of the present invention, a reset signal is communicated to counting circuit 360 from an external reset logic circuit (not shown), and not from base time interval timer 410 at the end of the base time interval, thereby permitting counting to continue past the end of a base time interval.

Sample window initiate circuit 430 pseudo-randomly generates a sample window initiate time, the sample window initiate time being a delay time from the start of base time interval. In one example embodiment, sample window initiate circuit includes a latch register holding a value defining the number of clock cycles to delay initiation of sample window interval timer 420 to provide a delay time from a finite set of discrete delay times (i.e., a multiple of clock cycles). In a more particular example embodiment, the latch register is a shifting latch register, for example, a round robin latch 432 as illustrated in the example embodiment of FIG. 4. In a further example embodiment, latch register 432 has a bit length of N. Round robin latch 432 is initially reset to "0." A pseudo-random number generator 434 subsequently seeds, or populates, latch register 432 with pseudo-randomly determined binary values to provide a pseudo-random delay time.

In a more particular example embodiment, pseudo-random number generator 434 has a bit length K, K being less than N. After chip initialization and activity detection circuit 202 is operational, pseudo-random number generator 434 starts free running for several cycles (e.g., 5 cycles), after which the contents of pseudo-random number generator 434 are loaded into round robin latch 432. While pseudo-random number generator 434 continues to free run, round robin latch 432 begins to shift and wrap contents of the round robin latch around for a number of cycles (e.g., 10 cycles) to increase the randomness of round robin latch 434's value, and then stops. In this manner, an N bit pseudo-random number is formed in round robin latch 432. To provide good randomness of round robin latch 432 contents, both pseudo-random number generator 434 and round robin latch 432 are not reset except at an initialization stage. First digital counter 416 begins counting once round robin latch contents are fixed. As discussed further below, the pseudo-random value of sample window initiate circuit is supervised by delay range logic circuit 436 to those values of delay time that allow sample window interval time to start and end within base time interval.

Sample window initiate circuit 430 communicates the sample window initiate time to comparator 440. Comparator 440 determines when base time interval time (i.e., the value of counter 416) is equivalent to sample window initiate time (i.e., the value of latch register 432), and communicates an output signal to sample window interval timer 420 to start timing a sample window interval.

In one example embodiment, sample window timer is a digital counter 426. Counter 426 receives a signal from clock 325, counting clock cycles in a similar manner to that described for counter 416. In one example embodiment, sample window interval time is defined as a particular value of counter 426. In a more particular example embodiment, sample window interval time is proportional to the bit length of counter 426, for example, by arranging an overflow bit 427, or alternatively a most significant bit, of counter 426 to stop sample window interval time. Where sample window interval time is proportional to counter 426 bit length, the bit length of counter 426 is M+1, where M is less than or equal to N, when the same clock signal is used to increment counter 426, since sample window interval time must be less than or equal to base time interval.

Sample window interval timer generates an output signal on output terminal 422 during sample window interval enabling coincidence circuit 250 to pass digital event pulses from input terminal 254 to output terminal 258. Coincidence circuit 250 is alternatively a sampler circuit adapted to function as described for coincidence circuit. Sample window interval timer does not generate an output signal at output terminal 422 outside sample window interval time (i.e., when sample window interval timer is not timing). Sample window interval time is selectable as a value of clock cycles, but generally fixed to provide a constant sampling period within base time period. Each of base time period, delay time and sample window time interval are selectable for a particular application by those skilled in the art to obtain the desired degree of measurement accuracy. Round robin latch is enabled to shift again after sample window interval timer stops and is reset.

In one example embodiment, counter 416 is coupled to terminal 414 to communicate a reset to counting circuit 360. While an overflow bit 415 of counter 416 is shown in FIG. 4 coupled to terminal 414, other bits are used to generate the reset signal in alternative example embodiments of the present invention and round robin latch 432 has a length corresponding to the length of counter 416 used to time the base time interval. When base time interval timer 410 times out to a predetermined value of counter 416 at the conclusion of a base time interval, an interval end signal is communicated to reset counting circuit 360, counter 416 is stopped and reset, and round robin latch 432 is once again frozen for another base time interval of event sampling. In an alternative embodiment of the present invention, terminal 414 is not coupled to counting circuit 360, and counting circuit is not reset at the end of a base time interval. The reset input of counting circuit 360 is optionally coupled to an external reset logic circuit (not shown) from which a reset signal is derived in an alternative embodiment.

Figure 5A:
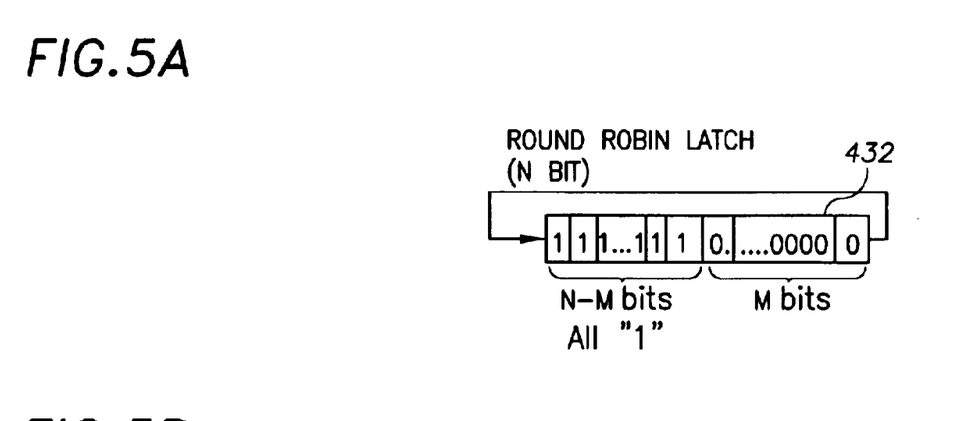
FIG. 5A is a block diagram of a round robin latch illustrating extreme case bit values in accordance with the present invention.

Sample window counter initiation time is supervised to occur within the time base interval to ensure sample window interval is initiated sufficiently early within base time interval to allow sample window interval timer to time out during base time interval. Otherwise the sampling window interval time gets truncated, thus becoming smaller than other sampling window intervals, and statistical accuracy is lost. FIG. 5A illustrates an extreme case where all the more significant bits (i.e., N-M bits) in round robin latch 432 are all "1" and the lesser significant bits (i.e., M bits) are all "0." There are many different ways to design around the aforementioned condition. One example embodiment of a method to supervise the value of round robin latch 432 to initiate sample window interval counter sufficiently early within time base interval is to convert the (M+1)th bit of round robin latch 432 to always be "0" before forwarding the delay time to comparator 440. However, this method unnecessarily constrains one half (i.e., 50%) of the possible sample window interval initiation times during the time base interval and reduces the randomness of the sampling window interval location accordingly.

Figure 5B:
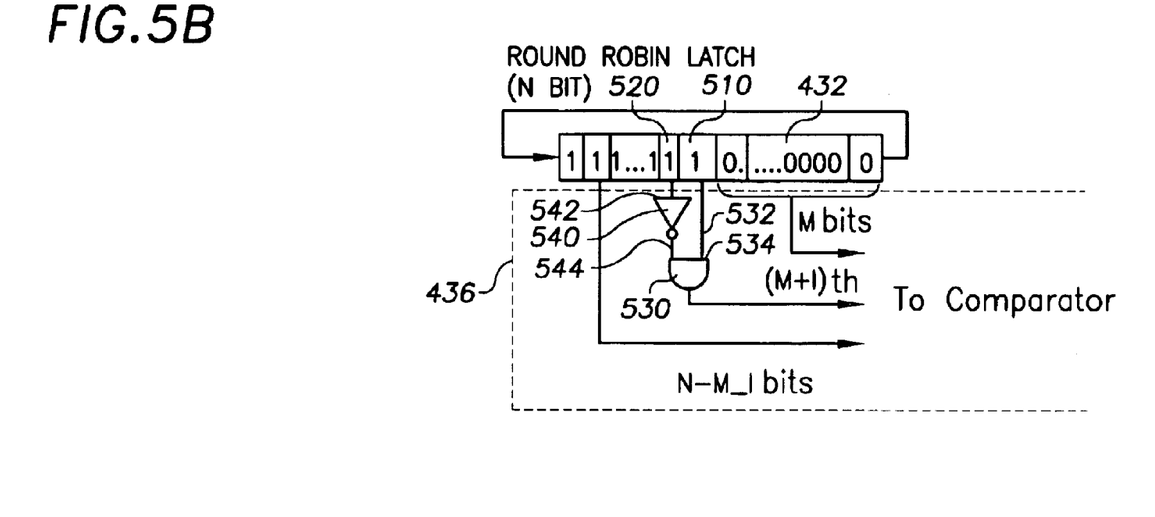
FIG. 5B is a block diagram of one example embodiment of a delay range logic circuit in accordance with the present invention.

Another example embodiment of method to supervise the value of round robin latch 432 to initiate sample window interval counter sufficiently early within time base interval, as implemented by delay range logic circuit 436, is illustrated in FIG. 5B. An (M+1)th bit 510 of round robin latch 432 is coupled to a first input terminal 532 of AND gate 530. An (M+2)th bit 520 of round robin latch 432 is coupled to an input terminal 542 of inverter 540, an output terminal 544 of inverter 540 being coupled to a second input terminal 534 of AND gate 530. This delay range logic circuit tests the (M+1)th bit 510 and (M+2)th bit 520 to convert final (M+1)th bit of the delay time to a conditional "0." The Boolean function of the final (M+1)th bit value is shown as follows:

$$\text{Final } (M+1)\text{th value} = \sim(M+2)\text{th}^*(M+1)\text{th}$$

having a truth table as follows:

| Original bit value | | Final bit values |
|---|---|---|
| (M + 1)th | (M + 2)th | (M + 1)th |
| 0 | 0 | 0 |
| 0 | 1 | 0 |
| 1 | 0 | 1 |
| 1 | 1 | 0 |

To improve the randomness of the sampling window interval initiation, the Boolean function is generalized to the following equation:

$$\text{Final } (M+1)\text{th value} = \sim(N)\text{th}^*\sim(N-1)\text{th}^* \ldots \sim(M+3)\text{th}^*\sim(M+2)\text{th}^*\sim(M+1)\text{th}$$

This embodiment of delay range logic circuit 436 maintains good randomness in the sampling window interval initiation, constraining only one quarter (i.e., 25%) of the possible sample window interval initiation times during the time base interval.

There are many different ways to implement the circuit blocks of the pseudo-random number generator, round robin latch, base time interval timer, and sample window interval timer. The pseudo-random number generator and round robin latch are merged into one entity in one example embodiment of the present invention.

One advantage in implementing the circuit element embodiments of the present invention is a more scalable layout. In one example embodiment of the present invention, the comparator is designed as bit slices and fit into the pitch of flip-flops used to implement the counters. A system designer skilled in the relevant art of the present invention is capable of defining a bit length for each of the various counters appropriate to the data sampling requirements of a unique application.

Accordingly, the present invention is not to be necessarily limited to the particular examples described above, but is intended to cover all aspects of the invention as fairly set out in the attached claims. For instance, while a VLSI system chip performance monitoring configurations are illustrated, other performance monitoring constructions can benefit from the above-mentioned teachings. Various modifications, equivalent processes, as well as numerous structures, including electrical charge storage devices alternative to capacitor implementations, to which the present invention may be applicable will be readily apparent to those of skill in the art to which the present invention is directed upon review of the present specification. The claims are intended to cover such modifications and devices.

I claim:

1. A circuit arrangement for sampling a logic data signal, comprising;
    a first timer adapted to time a first time interval;
    a delay timer coupled to the first timer and adapted to time a delay time interval initiated from the start of the first time interval;
    a second timer coupled to the delay timer and adapted to time a second time interval initiated at the end of the delay time interval;
    a coincidence circuit having an input terminal for receiving the logic data signal, an output terminal, and an enable terminal coupled to the second timer, the coincidence circuit adapted to pass a sample of digital event pulses comprising the logic data signal from the input terminal to the output terminal during the second time interval.

2. The circuit arrangement of claim 1, wherein the first timer is a binary count register having N+1 bits, the delay timer is a latch register having N bits, and the binary count register and latch register are coupled to a comparator circuit, and the comparator circuit adapted to initiate the second timer when the value of the binary count register an the value of the latch register are equivalent.

3. The circuit arrangement of claim 2, wherein the delay timer is adapted to pseudo-randomly vary the delay time interval.

4. The circuit arrangement of claim 3, wherein the delay timer is adapted to select the delay time interval from a finite set of discrete times.

5. The circuit arrangement of claim 3, wherein the latch register is a latching shift register.

6. The circuit arrangement of claim 5, further comprising a pseudo-random number generator coupled to the latch register, the pseudo-random number generator having less bits than the latch register and the pseudo-random number generator adapted to seed the latch register.

7. The circuit arrangement of claim 6, wherein the latching shift register is a round robin latch.

8. The circuit arrangement of claim 7, wherein the second timer is a second binary counter having M+1 bits, M being less than or equal to N.

9. The circuit arrangement of claim 8, wherein the first timer is adapted to time a series of periodic first time intervals.

10. The circuit arrangement of claim 9, wherein the delay timer is adapted to determine and time a new delay time interval for each first time interval in the series of first time intervals.

11. The circuit arrangement of claim 10, further comprising a counting circuit coupled to the output terminal of the coincidence circuit, the counting circuit adapted to accumulate a count of the digital event pulses in the sample.

12. The circuit arrangement of claim 11, wherein the counting circuit is reset responsive to the first timer.

13. A circuit arrangement for sampling a plurality of digital event pulses, comprising:
    a first timer adapted to time a plurality of base time intervals;

a second timer adapted to generate a sampling window signal for a sampling window time interval, the sampling window time interval being a shorter time than any of the base time intervals;

a sample window initiate circuit coupled to the first timer and adapted to start the second timer at a pseudo-random time within each of the plurality of base time in intervals; and a sampler circuit coupled to the second timer and arranged to receive the plurality of digital event pulses and to pass a sample of digital event pulses responsive to the sampling window signal.

14. The circuit arrangement of claim 13, further comprising a counting circuit coupled to the sampler circuit, the counting circuit adapted to accumulate a count of the sample of digital event pulses.

15. The circuit arrangement of claim 14, wherein the counting circuit a digital counter.

16. The circuit arrangement of claim 14, wherein the counting circuit further comprises a capacitor coupled through a transistor to a constant current source, the transistor being responsive to each of the digital event pulses to pass a substantially fixed amount of charge from the constant current source to the capacitor.

17. The circuit arrangement of claim 15, wherein the first timer is a binary counter having N+1 bits, and the second timer is a binary counter having M+1 bits, M being less than or equal to N.

18. The circuit arrangement of claim 17, wherein the first and second timers are adapted to count clock cycles, and the pseudo-random time being a discrete binary value of first timer.

19. The circuit arrangement of claim 18, wherein the sampling window initiate circuit comprises a pseudo-random number generator having K bits coupled to a shift register having N bits, the shift register arranged to receive and shift binary pseudo-random numbers from the pseudo-random number generator to form N bit pseudo-random numbers, whereby K is less than or equal to N.

20. The circuit arrangement of claim 19, wherein the shift register is a round robin latch.

21. The circuit arrangement of claim 20, wherein the overflow bit of the first timer is coupled to the counting circuit, the counting circuit adapted to reset responsive to the overflow bit of the first timer.

22. A method for sampling a logic data signal, comprising:

receiving a plurality of digital event pulses characterizing the logic data signal during each of a series of base time intervals;

applying a sampling window signal for a sample window time interval beginning at a pseudo-random time during each of a series of base time intervals;

selecting a subset of digital event pulses during application of the sampling window signal; and accumulating a count of the subset digital event pulses.

23. The method of claim 22, further comprising:

timing each base time interval with a base time binary counter, the base time binary counter adapted to count clock cycles; and timing the sample window time interval with a sample window binary counter, the sample window binary counter adapted to count clock cycles.

24. The method of claim 23, further comprising:

seeding a round robin latch with a pseudo-random number generator, the round robin latch having a length of N bits, the base time counter having a length of N+1 bits, and the pseudo-random number generator having fewer bits than the round robin latch;

shifting round robin latch bit values and populating all bits of the round robin latch;

forming an N bit pseudo-random number in the round robin latch; and initiating timing of the sample window time interval when a value of the base time binary counter is equivalent to a value of the round robin latch.

25. The method of claim 24, further comprising resetting the count of the subset of digital event pulses accumulated at the end of each base time interval.

26. A circuit arrangement to sample a logic data signal, comprising:

means for receiving a plurality of digital event pulses characterizing the logic data signal during each of a series of base time intervals;

means for applying a sampling window signal for a sample window time interval beginning at a pseudo-random time during each of a series of base time intervals;

means for selecting a subset of digital event pulses during application of the sampling window signal; and means for accumulating a count of the subset digital event pulses.

* * * * *